(12) United States Patent
Yoo et al.

(10) Patent No.: US 12,510,570 B2
(45) Date of Patent: Dec. 30, 2025

(54) VOLTAGE LEVEL DETECTOR PERFORMING STATE DETECTION

(71) Applicant: SAMSUNG ELECTRONICS CO., LTD., Suwon-si (KR)

(72) Inventors: Sungmin Yoo, Seoul (KR); Jaeseung Lee, Hwaseong-si (KR); Taehwang Kong, Suwon-si (KR); Junhyeok Yang, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 747 days.

(21) Appl. No.: 17/827,084

(22) Filed: May 27, 2022

(65) Prior Publication Data

US 2022/0381807 A1 Dec. 1, 2022

(30) Foreign Application Priority Data

May 31, 2021 (KR) .......................... 10-2021-0070110

(51) Int. Cl.
- *G01R 19/165* (2006.01)
- *G01R 15/04* (2006.01)
- *G01R 19/175* (2006.01)

(52) U.S. Cl.
CPC ....... *G01R 19/16576* (2013.01); *G01R 15/04* (2013.01)

(58) Field of Classification Search
CPC .............. G01R 19/175; G01R 19/2513; G01R 31/2856; G01R 19/16538; G01R 19/16576; G01R 15/04
See application file for complete search history.

(56) References Cited

U.S. PATENT DOCUMENTS

| | | | |
|---|---|---|---|
| 5,502,416 A | 3/1996 | Pietrobon | |
| 7,199,566 B2 | 4/2007 | Suzuki | |
| 8,054,057 B2 | 11/2011 | Dash et al. | |
| 8,971,060 B2 * | 3/2015 | Wu .................. | H02M 3/33523 363/21.13 |
| 9,104,221 B2 | 8/2015 | Kim | |
| 9,246,460 B2 | 1/2016 | Khlat et al. | |

(Continued)

FOREIGN PATENT DOCUMENTS

EP 2239588 A1 10/2010

OTHER PUBLICATIONS

European Search Report Dated Nov. 18, 2022 Cited in European Application No. 22175929.3.

*Primary Examiner* — Huy Q Phan
*Assistant Examiner* — Temilade S Rhodes-Vivour
(74) *Attorney, Agent, or Firm* — Fish & Richardson P.C.

(57) ABSTRACT

A voltage level detector includes a voltage divider that generates a first division voltage and a second division voltage. A first comparator compares any one of the first and second division voltages with a reference. A second comparator compares the other of the first and second division voltages with the reference. A first switch converts a connection path between the first and second division voltages and the first and second comparators based on a clock signal. A determination circuit determines, based on a first comparison signal and a second comparison signal, whether the voltage level detector is normal. A second switch converts a connection path between the first and second comparison signals and input terminals of the determination circuit based on the clock signal.

20 Claims, 12 Drawing Sheets

(56) References Cited

U.S. PATENT DOCUMENTS

| | | | |
|---|---|---|---|
| 9,329,210 B1 | 5/2016 | Gupta et al. | |
| 9,830,960 B2 | 11/2017 | Lee et al. | |
| 10,823,787 B2 | 11/2020 | Schat | |
| 2004/0198262 A1* | 10/2004 | Ehrenreich | H03G 3/3052 |
| | | | 455/67.11 |
| 2008/0238500 A1* | 10/2008 | Jung | H03K 3/356008 |
| | | | 327/143 |
| 2010/0085675 A1* | 4/2010 | Oki | H02M 1/38 |
| | | | 361/101 |
| 2011/0210712 A1* | 9/2011 | Tagare | H02M 1/083 |
| | | | 323/284 |
| 2014/0334049 A1* | 11/2014 | Singh | G11C 7/04 |
| | | | 361/91.5 |
| 2015/0022169 A1* | 1/2015 | Cannankurichi Vijaya Mohan | H02M 3/07 |
| | | | 323/282 |
| 2015/0280557 A1* | 10/2015 | Xue | H02M 3/156 |
| | | | 323/271 |
| 2018/0316225 A1 | 11/2018 | Yeo et al. | |
| 2019/0257871 A1 | 8/2019 | Marvin et al. | |
| 2020/0159265 A1 | 5/2020 | Wright | |
| 2020/0333818 A1 | 10/2020 | Yun et al. | |

\* cited by examiner

FIG. 9

| VLD STATE | Vreg STATE | D1 | | D2 | | sigR | |
|---|---|---|---|---|---|---|---|
| | | p1 | p2 | p1 | p2 | p1 | p2 |
| NORMAL FIRST COMPARATOR AND SECOND COMPARATOR | NORMAL RANGE | H | H | L | L | H | H |
| | LESS THAN LOWER LIMIT | L | L | L | L | L | L |
| | GREATER THAN UPPER LIMIT | H | H | H | H | L | L |
| ABNORMAL FIRST COMPARATOR sig1 FIXED TO H | NORMAL RANGE | H | H | H | L | L | H |
| | LESS THAN LOWER LIMIT | L | H | H | L | L | H |
| | GREATER THAN UPPER LIMIT | H | H | H | H | L | L |
| ABNORMAL FIRST COMPARATOR sig1 FIXED TO L | NORMAL RANGE | H | L | L | L | H | L |
| | LESS THAN LOWER LIMIT | L | L | L | L | L | L |
| | GREATER THAN UPPER LIMIT | H | L | L | H | H | L |
| ABNORMAL SECOND COMPARATOR sig2 FIXED TO H | NORMAL RANGE | H | H | L | H | H | L |
| | LESS THAN LOWER LIMIT | H | L | L | H | H | L |
| | GREATER THAN UPPER LIMIT | H | H | H | H | L | L |
| ABNORMAL SECOND COMPARATOR sig2 FIXED TO L | NORMAL RANGE | L | H | L | L | L | H |
| | LESS THAN LOWER LIMIT | L | L | L | L | L | L |
| | GREATER THAN UPPER LIMIT | L | H | H | L | L | H |

VOLTAGE LEVEL DETECTOR PERFORMING STATE DETECTION

CROSS-REFERENCE TO RELATED APPLICATION

This application is based on and claims priority under 35 U.S.C. § 119 to Korean Patent Application No. 10-2021-0070110, filed on May 31, 2021, in the Korean Intellectual Property Office, the disclosure of which is incorporated by reference herein in its entirety.

BACKGROUND

The disclosure relates to a voltage level detector, and more particularly, to a voltage level detector capable of directly detecting a state thereof.

A semiconductor memory device may include a voltage regulator for supplying a target voltage having a predetermined level to an internal circuit, such as a memory cell, etc. Generally, a voltage regulator may include a comparator, a p-type metal-oxide semiconductor (PMOS) transistor used as a driver, and resistors used as voltage division circuits.

A voltage level detector may determine whether an output voltage of the voltage regulator corresponds to a target voltage or is in a target range and may monitor whether the voltage regulator normally operates. When the voltage level detector normally operates, the breakdown of the voltage regulator may be determined. However, when the voltage level detector abnormally operates, it may be difficult to determine the breakdown of the voltage regulator. That is, although it is different from a case in which the voltage regulator is the one abnormally operating, a potentially defective situation in which it may not be determined that the voltage regulator is abnormally operating may occur.

SUMMARY

The disclosure provides a voltage level detector not only capable of determining a state of a voltage regulator, but also capable of directly determining whether or not the voltage level detector is in a normal state.

According to an aspect of the disclosure, there is provided a voltage level detector including a voltage divider configured to generate a first division voltage and a second division voltage based on a first voltage, which is an output voltage of a voltage regulator. A first comparator compares any one of the first and second division voltages with a reference voltage. A second comparator compares the other of the first and second division voltages with the reference voltage. A first switch converts a connection path between the first and second division voltages and the first and second comparators, according to control of a clock signal. A determination circuit determines, based on a first comparison signal that is an output of the first comparator and a second comparison signal that is an output of the second comparator, whether the voltage level detector is in a normal state. A second switch converts a connection path between the first and second comparison signals and input terminals of the determination circuit, according to the control of the clock signal.

According to another aspect of the disclosure, there is provided a voltage level detector having a voltage divider configured to receive a first voltage, which is an output voltage of a voltage regulator, and generate a first division voltage and a second division voltage based on the first voltage. A first switch includes: (1) a first input terminal and a second input terminal configured to receive the first and second division voltages, respectively, and (2) a first output terminal and a second output terminal configured to output, according to control of a clock signal, the first and second division voltages, respectively. A first comparator is connected to one of the first and second output terminals of the first switch and configured to receive a reference voltage and output a first comparison signal. A second comparator is connected to the other of the first and second output terminals of the first switch and configured to receive the reference voltage and output a second comparison signal. A second switch includes: (3) a third input terminal and a fourth input terminal configured to receive the first and second comparison signals, respectively, and (4) a third output terminal and a fourth output terminal configured to output, according to control of the clock signal, the first and second comparison signals, respectively. A determination circuit is configured to receive the first and second comparison signals and output a result signal indicating whether the voltage level detector is in a normal state.

According to another aspect of the disclosure, there is provided a voltage level detector including a voltage division circuit configured to generate a first division voltage and a second division voltage that are proportionate to a first voltage received from outside. A comparison circuit compares each of the first and second division voltages with a reference voltage and outputs a first comparison signal and a second comparison signal. A determination circuit generates a result signal based on the first and second comparison signals. A switch circuit converts a connection path between output terminals of the voltage division circuit and input terminals of the comparison circuit and converts a connection path between output terminals of the comparison circuit and input terminals of the determination circuit, according to control of a clock signal.

BRIEF DESCRIPTION OF THE DRAWINGS

Embodiments of the disclosure will be more clearly understood from the following detailed description taken in conjunction with the accompanying drawings in which:

FIG. 9 is a table of a relationship between a signal and a state of a voltage level detector according to an example embodiment;

DETAILED DESCRIPTION OF THE EMBODIMENTS

Hereinafter, embodiments of the disclosure are described in detail with reference to the accompanying drawings.

Figure 1:
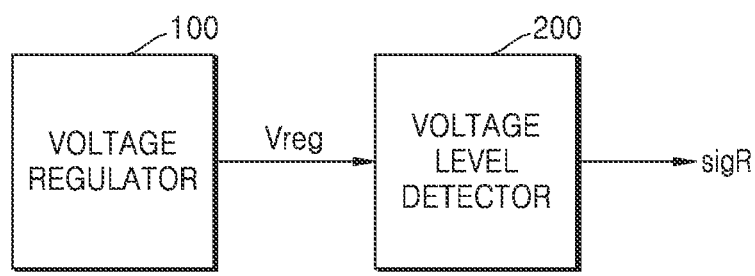
FIG. 1 is a block diagram of a power management device according to an example embodiment.

FIG. 1 is a block diagram of a power management device 10 according to an example embodiment.

Referring to FIG. 1, the power management device 10 may include a voltage regulator 100 and a voltage level detector 200.

The voltage regulator 100 may generate an output voltage Vreg based on an input voltage and adjust a level of the output voltage Vreg to a target level. The target level may be determined according to a specification of a load device receiving the output voltage Vreg. For example, the voltage regulator 100 may include a low-dropout (LDO) regulator, a buck regulator, a boost regulator, etc. The voltage regulator 100 may provide the output voltage Vreg to the voltage level detector 200.

The voltage level detector 200 may monitor the output voltage Vreg and determine whether the output voltage Vreg is in a normal range or not. For example, the voltage level detector 200 may determine whether the output voltage Vreg is in a range between lower limit and upper limit voltages (for example, V1 and V2 of FIG. 5, respectively) of the normal range. The lower limit voltage V1 and the upper limit voltage V2 may be determined according to the specification of a load device. The voltage level detector 200 may generate a result of the determination as a result signal sigR and provide the result signal sigR to the outside, for example, a controller (not shown).

According to an embodiment, the controller may determine, based on the result signal sigR, whether or not the voltage regulator 100 is normal and/or whether or not the voltage level detector 200 is normal. For example, based on the result signal sigR having a first logic level, the controller may determine that the voltage level detector 200 is in a normal state, and based on the result signal sigR having a second logic level, the controller may determine that the voltage level detector 200 is in an abnormal state.

According to an embodiment, the result signal sigR may be toggled by a clock signal CLK. Thus, based on a change of the result signal sigR according to toggling of the clock signal CLK, the controller may determine whether or not the voltage regulator 100 and/or the voltage level detector 200 are (is) normal. For example, when the result signal sigR maintains the first logic level even when the clock signal CLK is toggled, the controller may determine that the voltage level detector 200 is in a normal state.

For example, when the result signal sigR is toggled from the first logic level to the second logic level or from the second logic level to the first logic level, the controller may determine that the voltage level detector 200 is in an abnormal state when the clock signal CLK is toggled from the first logic level to the second logic level.

According to an embodiment, the power management device 10 may determine whether or not the output voltage Vreg of the voltage regulator 100 is in a normal range. In addition, the power management device 10 may determine whether or not the voltage level detector 200 is in a normal state, without including an additional external circuit. Thus, a case in which, while the voltage regulator 100 is in an abnormal state, the abnormal state of the voltage regulator 100 is not detected, due to malfunction of the voltage level detector 200, may be prevented.

Thus, because a state of the voltage level detector 200 configured to determine an abnormal state of the voltage regulator 100 may be detected, a latent fault situation may be prevented in advance.

FIG. 1 illustrates that the voltage regulator 100 and the voltage level detector 200 are included in one power management device 10. However, the disclosure is not limited thereto. For example, the voltage regulator 100 may be included in a power management integrated circuit (PMIC) and the voltage level detector 200 may be included in a device connected to the PMIC and receiving a power supply.

Figure 2:
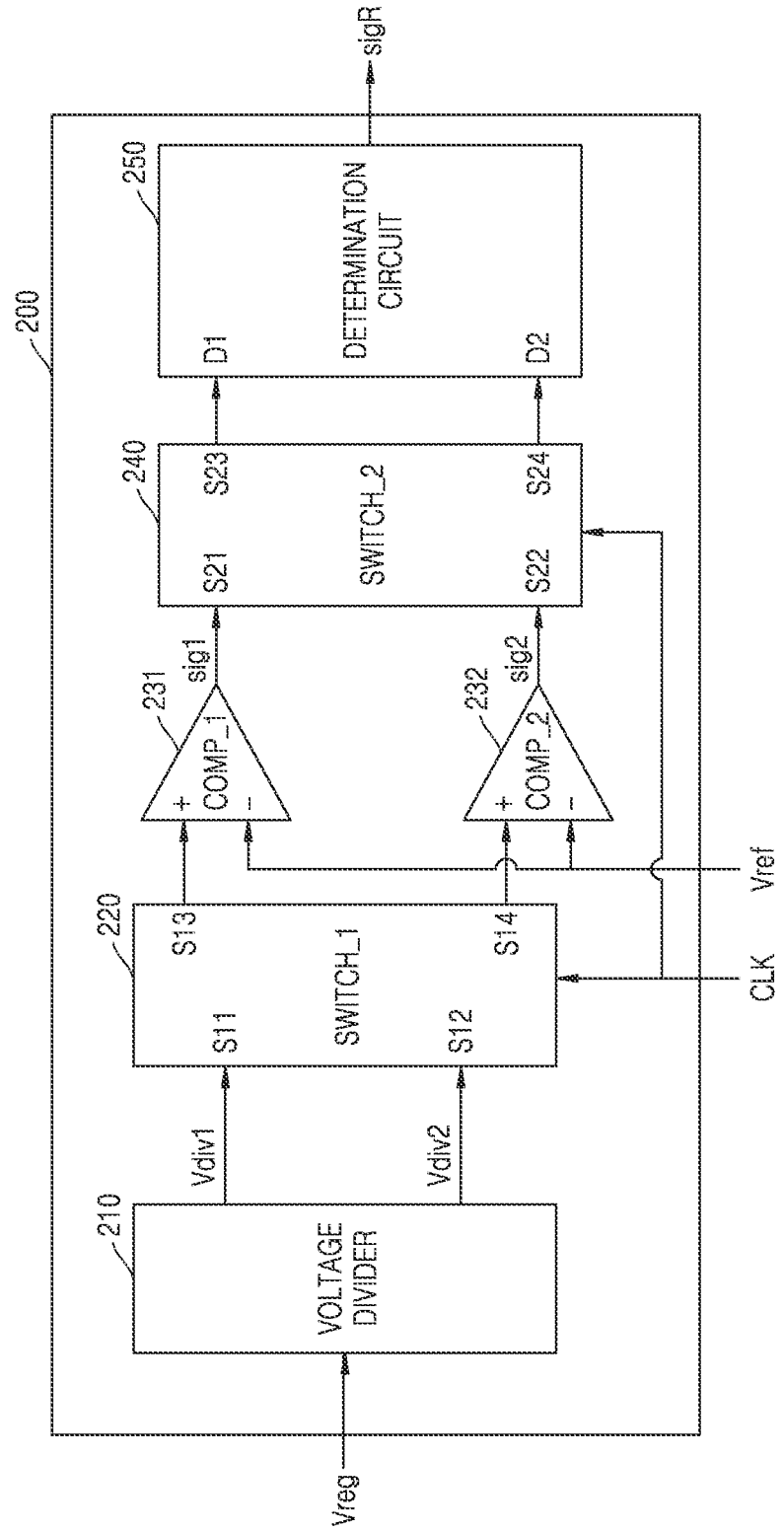
FIG. 2 is a block diagram of a voltage level detector according to an example embodiment.

FIG. 2 is a block diagram of the voltage level detector 200 according to an example embodiment.

Referring to FIG. 2, the voltage level detector 200 may include a voltage divider 210, a first switch 220, a second switch 240, a first comparator 231, a second comparator 232, and a determination circuit 250.

The voltage divider 210 may receive an output voltage Vreg and generate a plurality of division voltages, that is, a first division voltage Vdiv1 and a second division voltage Vdiv2, which are proportional to a magnitude of the output voltage Vreg. For example, the voltage divider 210 may generate the first division voltage Vdiv1 and the second division voltage Vdiv2 and a magnitude of the first division voltage Vdiv1 may be greater than a magnitude of the second division voltage Vdiv2. As described below with reference to FIG. 3, the voltage divider 210 may include a plurality of resistors connected in series.

The first switch 220 may include two input terminals, that is a first input terminal S11 and a second input terminal S12, and two output terminals, that is a first output terminal S13 and a second output terminal S14. The first switch 220 may receive a clock signal CLK and convert, according to control of the clock signal CLK, connection paths of the first and second input terminals S11 and S12 and the first and second output terminals S13 and S14. According to an embodiment, the first switch 220 may connect the first input terminal S11 with the second output terminal S14 and the second input terminal S12 with the first output terminal S13, according to the clock signal CLK of a first logic level. Also, the first switch 220 may connect the first input terminal S11 with the first output terminal S13 and the second input terminal S12 with the second output terminal S14, according to the clock signal CLK of a second logic level. Due to toggling of the clock signal CLK, the connection paths in the first switch 220 may be periodically converted.

The first and second input terminals S11 and S12 of the first switch 220 may be connected to an output terminal of the voltage divider 210, and the first and second output terminals S13 and S14 of the first switch 220 may be connected to the first and second comparators 231 and 232. The first output terminal S13 of the first switch 220 may be connected to a non-inverted (+) input terminal of the first comparator 231, and the second output terminal S14 of the first switch 220 may be connected to a non-inverted (+) input terminal of the second comparator 232.

The first comparator 231 may receive a voltage of the first output terminal S13 of the first switch 220 and a reference voltage Vref and generate a first comparison signal sig1. The first comparator 231 may receive the reference voltage Vref through an inverted (−) input terminal of the first comparator 231. A detailed aspect with respect to the reference voltage Vref will be described below with reference to FIG. 6. When the voltage received through the non-inverted (+) input terminal of the first comparator 231 is greater than the reference voltage Vref, the first comparator 231 may generate the first comparison signal sig1 of a first logic level; and when the voltage received through the non-inverted (+) input terminal of the first comparator 231 is less than the reference voltage Vref, the first comparator 231 may generate the first comparison signal sig1 of a second logic level. For example, the first logic level may be a logic high level and the second logic level may be a logic low level.

The second comparator 232 may receive a voltage of the second output terminal S14 of the first switch 220 and the reference voltage Vref and generate a second comparison signal sig2. The second comparator 232 may receive the reference voltage Vref through an inverted (−) input terminal of the second comparator 232. When the voltage received through the non-inverted (+) input terminal of the second comparator 232 is greater than the reference voltage Vref, the second comparator 232 may generate the second comparison signal sig2 of a first logic level; and when the voltage received through the non-inverted (+) input terminal of the second comparator 232 is less than the reference voltage Vref, the second comparator 232 may generate the second comparison signal sig2 of a second logic level. For example, the first logic level may be a logic high level and the second logic level may be a logic low level. The first and second comparators 231 and 232 may be commonly referred to as comparison circuits.

The reference voltage Vref may have a predetermined value; and as signals provided to the first and second comparators 231 and 232 through the first and second output terminals S13 and S14 of the first switch 220 are changed, logic levels of the first and second comparison signals sig1 and sig2 may be changed. When the first and second comparators 231 and 232 do not normally operate, the first and second comparison signals sig1 and sig2 constantly having the same level (stuck signals) may be output, even when the signals input to the first and second comparators 231 and 232 are changed. Thus, the voltage level detector 200 may detect an abnormal state of the first and second comparators 231 and 232 based on the stuck first and second comparison signals sig1 and sig2.

Similar to the first switch 220, the second switch 240 may include two input terminals, that is a first input terminal S21 and a second input terminal S22, and two output terminals, that is a first output terminal S23 and a second output terminal S24. The second switch 240 may receive a clock signal CLK and convert, according to control of the clock signal CLK, connection paths between the first and second input terminals S21 and S22 and the first and second output terminals S23 and S24. According to an embodiment, the second switch 240 may connect the first input terminal S21 with the second output terminal S24 and the second input terminal S22 with the first output terminal S23 according to the clock signal CLK of a first logic level. Also, the second switch 240 may connect the first input terminal S21 with the first output terminal S23 and the second input terminal S22 with the second output terminal S24 according to the clock signal CLK of a second logic level. Due to toggling of the clock signal CLK, the connection paths in the second switch 240 may be periodically converted.

The first and second input terminals S21 and S22 of the second switch 240 may be connected to an output terminal of the first comparator 231 and an output terminal of the second comparator 232, respectively. Also, the first and second output terminals S23 and S24 of the second switch 240 may be connected to a first input terminal D1 and a second input terminal D2 of the determination circuit 250, respectively. The first output terminal S23 of the second switch 240 may be connected to the first input terminal D1 of the determination circuit 250, and the second output terminal S24 may be connected to the second input terminal D2 of the determination circuit 250. The first switch 220 and the second switch 240 may be commonly referred to as switch circuits.

The determination circuit 250 may include a plurality of logic gates, as described below with reference to FIG. 7. The determination circuit 250 may receive the first and second comparison signals sig1 and sig2 through the first and second output terminals S23 and S24 of the second switch 240 and generate a result signal sigR based on the first and second comparison signals sig1 and sig2. The result signal sigR may indicate whether or not the components of the voltage level detector 200 are abnormal. Logic levels of the result signal sigR may be changed according to toggling of the clock signal CLK.

According to an embodiment, when the result signal sigR maintains a first logic level (for example, logic high) despite the toggling of the clock signal CLK, the result signal sigR may indicate that the voltage level detector 200 is in a normal state. In detail, the result signal sigR may indicate that the first and second comparators 231 and 232 are in a normal state.

According to an embodiment, when the logic levels of the result signal sigR are changed according to the toggling of the clock signal CLK, the result signal sigR may indicate that the voltage level detector 200 is in an abnormal state. In detail, the result signal sigR may indicate that the first comparator 231 and/or the second comparator 232 are/is in an abnormal state.

Figure 3:
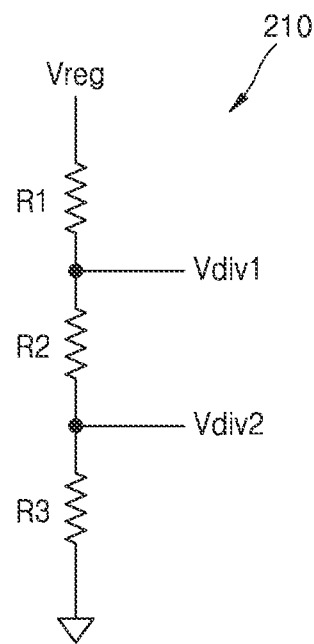
FIG. 3 is a circuit diagram of a voltage divider according to an example embodiment.

FIG. 3 is a circuit diagram of the voltage divider 210 according to an example embodiment.

Referring to FIG. 3, the voltage divider 210 may include a plurality of resistors. A first resistor R1 through a third resistor R3 may be serially connected between a node connected to an output voltage Vreg and a ground node. A magnitude of a first division voltage Vdiv1 and a magnitude of a second division voltage Vdiv2 may be as below.

$$Vdiv1 = \frac{R2 + R3}{R1 + R2 + R3} \times Vreg \qquad \text{[Equation 1]}$$

$$Vdiv2 = \frac{R3}{R1 + R2 + R3} \times Vreg$$

Referring to Equation 1, the first division voltage Vdiv1 and the second division voltage Vdiv2 may be proportional to the output voltage Vreg. Also, the magnitude of the first division voltage Vdiv1 may be greater than the magnitude of the second division voltage Vdiv2.

Figure 4:
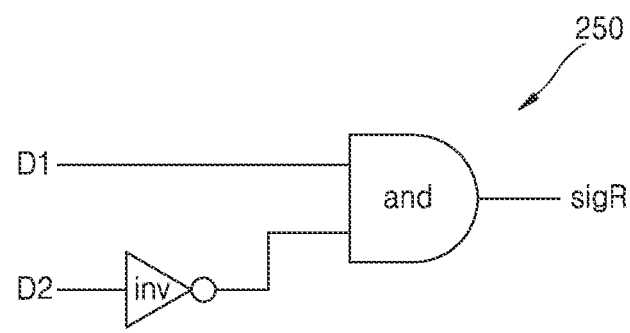
FIG. 4 is a logic diagram of a determination circuit according to an example embodiment.

FIG. 4 is a logic diagram of the determination circuit 250 according to an example embodiment.

Referring to FIG. 4, the determination circuit 250 may include a plurality of logic gates. For example, the determination circuit 250 may include an inverter inv and an AND gate and. The inverter inv may invert a signal received by the second input terminal D2 of the determination circuit 250. The AND gate and may generate a result signal sigR by performing an AND operation on a signal received by the first input terminal D1 of the determination circuit 250 and the signal inverted by the inverter inv. That is, the result signal sigR may be generated according to sigR=D1×D2'.

Figure 5:
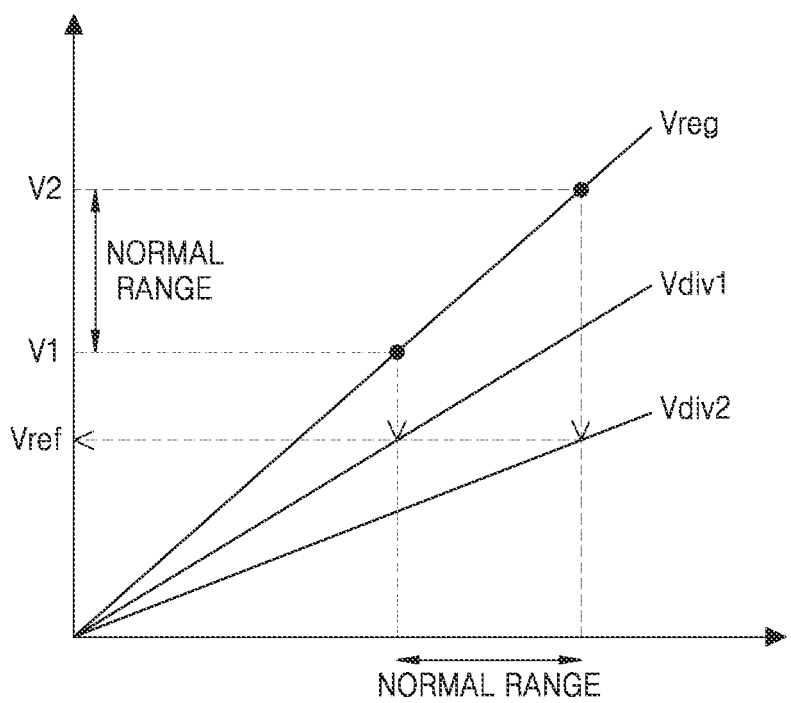
FIG. 5 is a diagram for describing a reference voltage according to an example embodiment.

FIG. 5 is a diagram for describing a reference voltage Vref according to an example embodiment.

Referring to FIG. 5, the voltage level detector 200 may not intactly use an output voltage Vreg and may use a first division voltage Vdiv1 and a second division voltage Vdiv2 based on the output voltage Vreg to determine whether or not the output voltage Vreg is in a normal range.

That is, based on the first and second division voltages Vdiv1 and Vdiv2, points at which the output voltage Vreg reaches a lower limit voltage V1 and an upper limit voltage V2 in a normal range may be detected. For example, the point at which the output voltage Vreg reaches the lower limit voltage V1 may be detected by using the first division voltage Vdiv1 and the point at which the output voltage Vreg reaches the upper limit voltage V2 may be detected by using the second division voltage Vdiv2.

According to an embodiment, the reference voltage Vref may be configured such that the first division voltage Vdiv1 reaches the reference voltage Vref when the output voltage Vreg reaches the lower limit voltage V1. Also, the reference voltage Vref may be configured such that the second division voltage Vdiv2 reaches the reference voltage Vref when the output voltage Vreg reaches the upper limit voltage V2.

Both of the point at which the output voltage Vreg reaches the lower limit voltage V1 and the point at which the output voltage Vreg reaches the upper limit voltage V2 may be detected by using one reference voltage Vref, and thus, a ratio between the second resistor R2 and the third resistor R3 of FIG. 3 may be determined according to Equation 2.

$$Vref = Vdiv1 = \frac{R2 + R3}{R1 + R2 + R3} \times V1 \quad \text{[Equation 2]}$$
$$Vref = Vdiv2 = \frac{R3}{R1 + R2 + R3} \times V2$$
$$\frac{R2 + R3}{R1 + R2 + R3} \times V1 = \frac{R3}{R1 + R2 + R3} \times V2$$
$$\therefore R2 = \frac{V2 - V1}{V1} \times R3$$

Referring to Equation 2, the voltage divider 210 may be designed based on the lower limit voltage V1 and the upper limit voltage V2 of the output voltage Vreg in a normal range.

Figure 6:
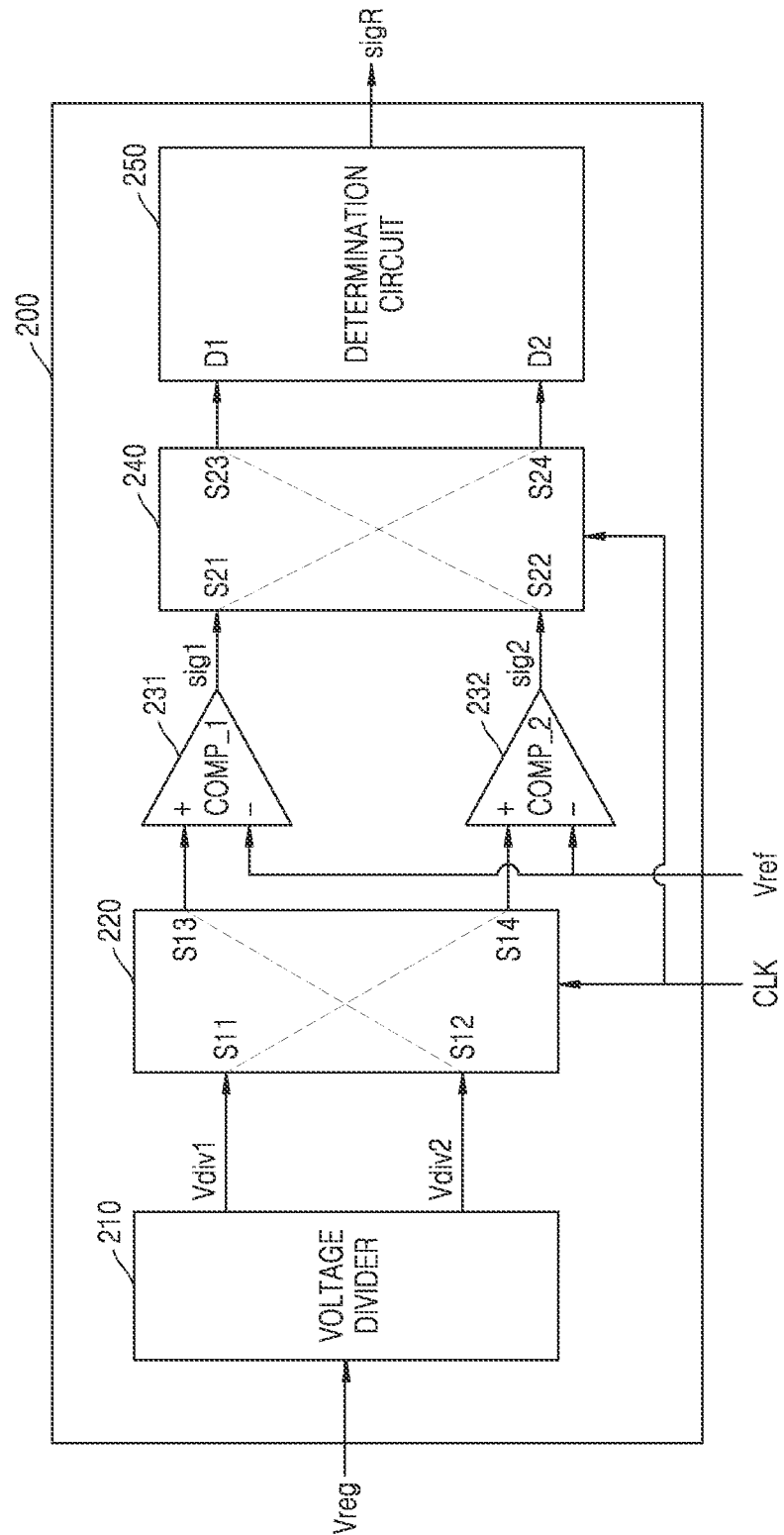
FIGS. 6 and 7 are example diagrams of an operation of a voltage level detector according to an example embodiment.
Figure 7:
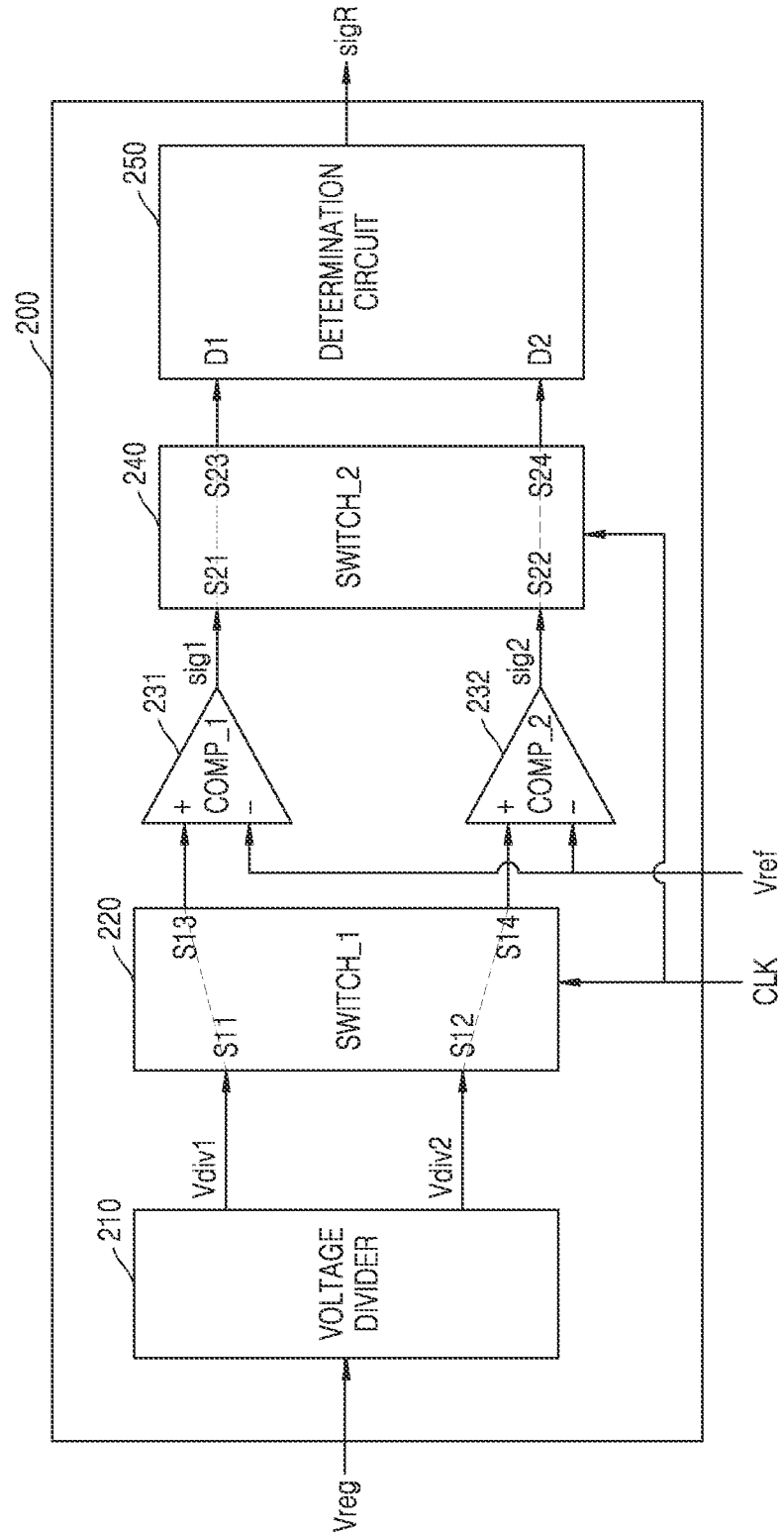
Figure 8:
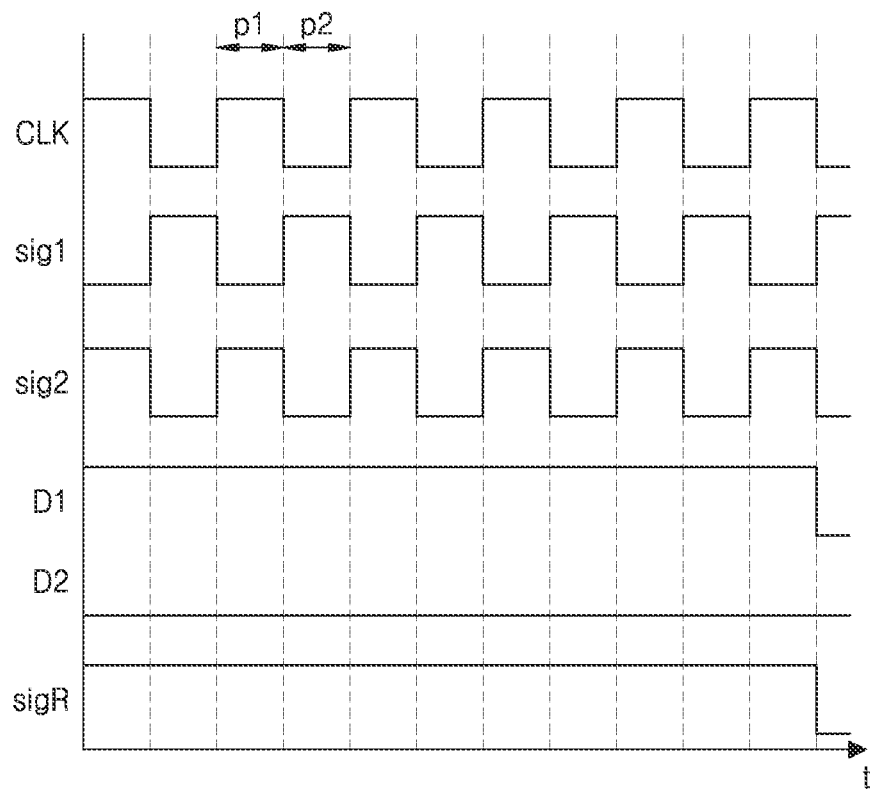
FIG. 8 is a timing diagram of signals of a voltage level detector according to an example embodiment.

FIGS. 6 and 7 are example diagrams of an operation of the voltage level detector 200 according to an example embodiment, and FIG. 8 is a timing diagram of signals of the voltage level detector 200 according to an example embodiment. A clock signal CLK may include a first section p1 having a first logic level (for example, logic high) and a second section p2 having a second logic level (for example, logic low). As described above, as the clock signal CLK is toggled, each of an internal connection relationship of the first switch 220 and an internal connection relationship of the second switch 240 may be changed. The operation shown in FIG. 6 may correspond to an operation of the voltage level detector 200 in the first section p1, and the operation shown in FIG. 7 may correspond to an operation of the voltage level detector 200 in the second section p2. The timing diagram of FIG. 8 illustrates a case in which the voltage regulator 100 and the voltage level detector 200 operate in a normal state.

Referring to FIGS. 6 and 8 together, the first switch 220 may connect the first input terminal S11 with the second output terminal S14 and the second input terminal S12 with the first output terminal S13 in the first section p1. Also, the second switch 240 may connect the first input terminal S21 with the second output terminal S24 and the second input terminal S22 with the first output terminal S23.

The voltage divider 210 may receive an output voltage Vreg and generate a first division voltage Vdiv1 and a second division voltage Vdiv2. Here, because the voltage regulator 100 normally operates, the output voltage Vreg may be in a normal range.

The first switch 220 may receive the first division voltage Vdiv1 through the first input terminal S11 and the second division voltage Vdiv2 through the second input terminal S12. Also, the first switch 220 may provide the second division voltage Vdiv2 to the first comparator 231 through the first output terminal S13 and the first division voltage Vdiv1 to the second comparator 232 through the second output terminal S14.

Because the first division voltage Vdiv1 may be greater than a reference voltage Vref, the second comparator 232 may generate a second comparison signal sig2 of logic high. Because the second division voltage Vdiv2 may be less than the reference voltage Vref, the first comparator 231 may generate a first comparison signal sig1 of logic low.

The second switch 240 may receive the first comparison signal sig1 through the first input terminal S21 and the second comparison signal sig2 through the second input terminal S22. Also, the second switch 240 may provide the second comparison signal sig2 to the first input terminal D1 of the determination circuit 250 through the first output terminal S23 and the first comparison signal sig1 to the second input terminal D2 of the determination circuit 250 through the second output terminal S24.

The determination circuit 250 may generate a result signal sigR of logic high by performing the logic operation described above with reference to FIG. 4.

Referring to FIGS. 7 and 8 together, the first switch 220 may connect the first input terminal S11 with the first output terminal S13 and the second input terminal S12 with the second output terminal S14 in the second section p2. Also, the second switch 240 may connect the first input terminal S21 with the first output terminal S23 and the second input terminal S22 with the second output terminal S24.

The first switch 220 may receive the first division voltage Vdiv1 through the first input terminal S11 and the second division voltage Vdiv2 through the second input terminal S12. Also, the first switch 220 may provide the first division voltage Vdiv1 to the first comparator 231 through the first output terminal S13 and the second division voltage Vdiv2 to the second comparator 232 through the second output terminal S14.

Because the first division voltage Vdiv1 may be greater than the reference voltage Vref, the first comparator 231 may generate the first comparison signal sig1 of logic high. Because the second division voltage Vdiv2 may be less than the reference voltage Vref, the second comparator 232 may generate the second comparison signal sig2 of logic low.

The second switch 240 may receive the first comparison signal sig1 through the first input terminal S21 and the second comparison signal sig2 through the second input terminal S22. Also, the second switch 240 may provide the first comparison signal sig1 to the first input terminal D1 of the determination circuit 250 through the first output terminal S23 and the second comparison signal sig2 to the second input terminal D2 of the determination circuit 250 through the second output terminal S24.

The determination circuit 250 may generate the result signal sigR of logic high by performing the logic operation described above with reference to FIG. 4.

The first switch 220 may identify whether each of the first and second comparators 231 or 232 normally operates or not, by changing the signals that are input to each of the first and second comparators 231 and 232, and the second switch 240 may arrange the signals such that the determination circuit 250 may constantly generate the result signal sigR of logic high with respect to the output voltage Vreg included in the normal range.

FIG. 9 is a table of a relationship between a signal and a state of the voltage level detector 200, according to an example embodiment.

Referring to FIG. 9, as the voltage regulator 100 is in a normal state, an output voltage Vreg may be in a normal range and when the first comparator 231 and the second comparator 232 are in normal states, regardless of toggling of a clock signal CLK, a result signal sigR may be maintained at a logic high.

When the output voltage Vreg is less than (or equal to or less than) the lower limit voltage V1, the first division voltage Vdiv1 and the second division voltage Vdiv2 may be less than a reference voltage Vref regardless of toggling of the clock signal CLK; and thus, the first and second comparators 231 and 232 may generate first and second comparison signals sig1 and sig2 of a logic low. Accordingly, the result signal sigR may be (0)*(0)'=0 that is a logic low.

When the output voltage Vreg is greater than (or equal to or greater than) the upper limit voltage V2, the first division voltage Vdiv1 and the second division voltage Vdiv2 may be greater than the reference voltage Vref regardless of toggling of the clock signal CLK; and thus, the first and second comparators 231 and 232 may generate first and second comparison signals sig1 and sig2 of a logic high. Accordingly, the result signal sigR may be (1)*(1)'=0 that is a logic low.

According to an embodiment, while the voltage regulator 100 is in a normal state, the first comparator 231 may abnormally operate. For example, the first comparator 231 may always generate the first comparison signal sig1 of logic high. Thus, the second input terminal D2 of the determination circuit 250 may receive the first comparison signal sig1 of logic high in a first section p1. Thus, in the first section p1, the result signal sigR may be (1)*(1)'=0 that is logic low. The first input terminal D1 of the determination circuit 250 may receive the first comparison signal sig1 of logic high in a second section p2. Thus, in the second section p2, the result signal sigR may be (1)*(0)'=1 that is logic high. When the output voltage Vreg is less than (or equal to or less than) the lower limit voltage V1, the first and second comparison signals sig1 and sig2 may have to be a logic low in both of the first section p1 and the second section p2. However, because the first comparator 231 operates abnormally, the first comparison signal sig1 may be constantly a logic high, and the second comparison signal sig2 may be a logic low. Accordingly, the result signal sigR may be a logic low in the first section p1 and a logic high in the second section p2. When the output voltage Vreg is greater than (or equal to or greater than) the upper limit voltage V2, the first and second comparison signals sig1 and sig2 may be a logic high in both of the first section p1 and the second section p2. Accordingly, the result signal sigR may be a logic low in both of the first and second sections p1 and p2.

According to an embodiment, the first comparator 231 may always generate the first comparison signal sig1 of a logic low. Thus, the second input terminal D2 of the determination circuit 250 may receive the first comparison signal sig1 of a logic low in the first section p1. Accordingly, in the first section p1, the result signal sigR may be (1)*(0)'=1 that is a logic high. The first input terminal D1 of the determination circuit 250 may receive the first comparison signal sig1 of a logic low in the second section p2. Accordingly, in the first section p1, the result signal sigR may be (0)*(0)'=0 that is a logic low. When the output voltage Vreg is less than (or equal to or less than) the lower limit voltage V1, the first and second comparison signals sig1 and sig2 may be a logic low in both of the first section p1 and the second section p2. Accordingly, the result signal sigR may be a logic low in the first and second sections p1 and p2. When the output voltage Vreg is greater than (or equal to or greater than) the upper limit voltage V2, the first and second comparison signals sig1 and sig2 may have to be a logic high in both of the first section p1 and the second section p2. However, because the first comparator 231 operates abnormally, the first comparison signal sig1 may be constantly a logic low, and the second comparison signal sig2 may be a logic high. Accordingly, the result signal sigR may be a logic high in the first section p1 and a logic low in the second section p2.

Likewise, the second comparator 232 may generate the second comparison signal sig2 that is constantly logic high or logic low. Accordingly, signals that are input to the first and second input terminals D1 and D2 of the determination circuit 250 in each of the first and second sections p1 and p2 may be as shown in FIG. 9. The result signal sigR as shown in FIG. 9 may be obtained based on processes substantially the same as described above.

According to an embodiment, the voltage level detector 200 may determine whether or not the voltage level detector 200 is in a normal state, based on a change in logic level of the result signal sigR according to toggling of the clock signal CLK. In detail, when the result signal sigR is toggled according to the clock signal CLK, the voltage level detector 200 may determine that the first comparator 231 and/or the second comparator 232 operate/operates abnormally. Accordingly, while an additional safety logic may not be provided, a state of the voltage level detector 200 may be detected.

Figure 10:
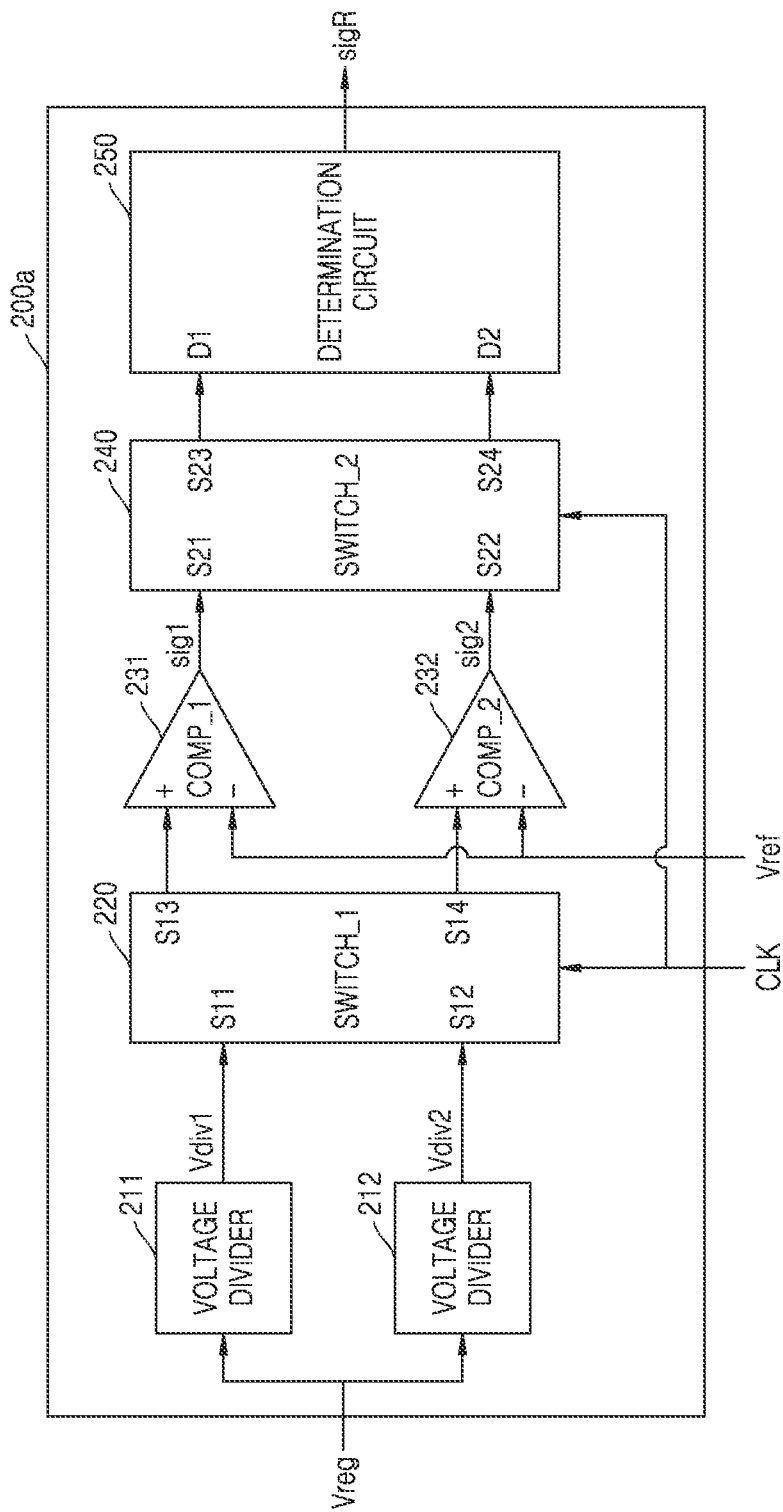
FIG. 10 is a block diagram of a voltage level detector according to an example embodiment.
Figure 11:
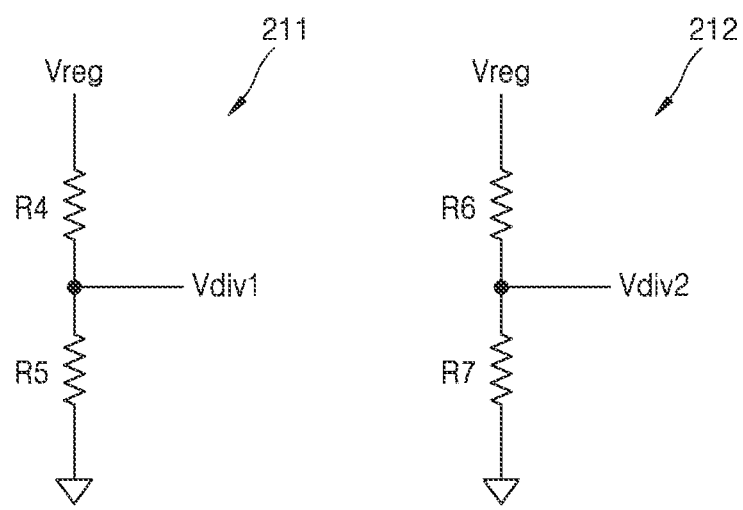
FIG. 11 is a circuit diagram of a voltage divider according to an example embodiment.

FIG. 10 is a block diagram of a voltage level detector 200a according to an example embodiment, and FIG. 11 is a circuit diagram of voltage dividers according to an example embodiment.

Referring to FIG. 10, the voltage level detector 200a may be substantially the same as the voltage level detector 200 described above with reference to FIGS. 1 through 9, and thus, the same aspects are not repeatedly described.

The voltage level detector 200a may include a plurality of voltage dividers, that is, a first voltage divider 211 and a second voltage divider 212. For example, the first voltage divider 211 may receive an output voltage Vreg and generate a first division voltage Vdiv1. The second voltage divider 212 may receive the output voltage Vreg and generate a second division voltage Vdiv2.

An output terminal of the first voltage divider 211 may be connected to the first input terminal S11 of the first switch 220, and an output terminal of the second voltage divider 212 may be connected to the second input terminal S12 of the first switch 220.

Referring to FIG. 11, the first voltage divider 211 may include a fourth resistor R4 and a fifth resistor R5. The fourth and fifth resistors R4 and R5 may be serially connected between a node connected to the output voltage Vreg and a ground node. The second voltage divider 212 may include a sixth resistor R6 and a seventh resistor R7. The sixth and seventh resistors R6 and R7 may be serially connected between a node connected to the output voltage Vreg and a ground node. A magnitude of the first division voltage Vdiv1 and a magnitude of the second division voltage Vdiv2 may be as Equation 3.

$$Vdiv1 = \frac{R5}{R4 + R5} \times Vreg \qquad \text{[Equation 3]}$$
$$Vdiv2 = \frac{R6}{R6 + R7} \times Vreg$$

Referring to Equation 3, the first division voltage Vdiv1 and the second division voltage Vdiv2 may be proportional to the output voltage Vreg. According to an embodiment, the magnitudes of the first division voltage Vdiv1 and the second division voltage Vdiv2 may be freely adjusted.

The voltage level detector 200a may have the same configurations as the voltage level detector 200, except for the first and second voltage dividers 211 and 212 configured to generate the first and second division voltages Vdiv1 and Vdiv2, respectively. Thus, the voltage level detector 200a may perform the operation of the voltage level detector 200, described above with reference to FIGS. 1 through 9.

Figure 12:
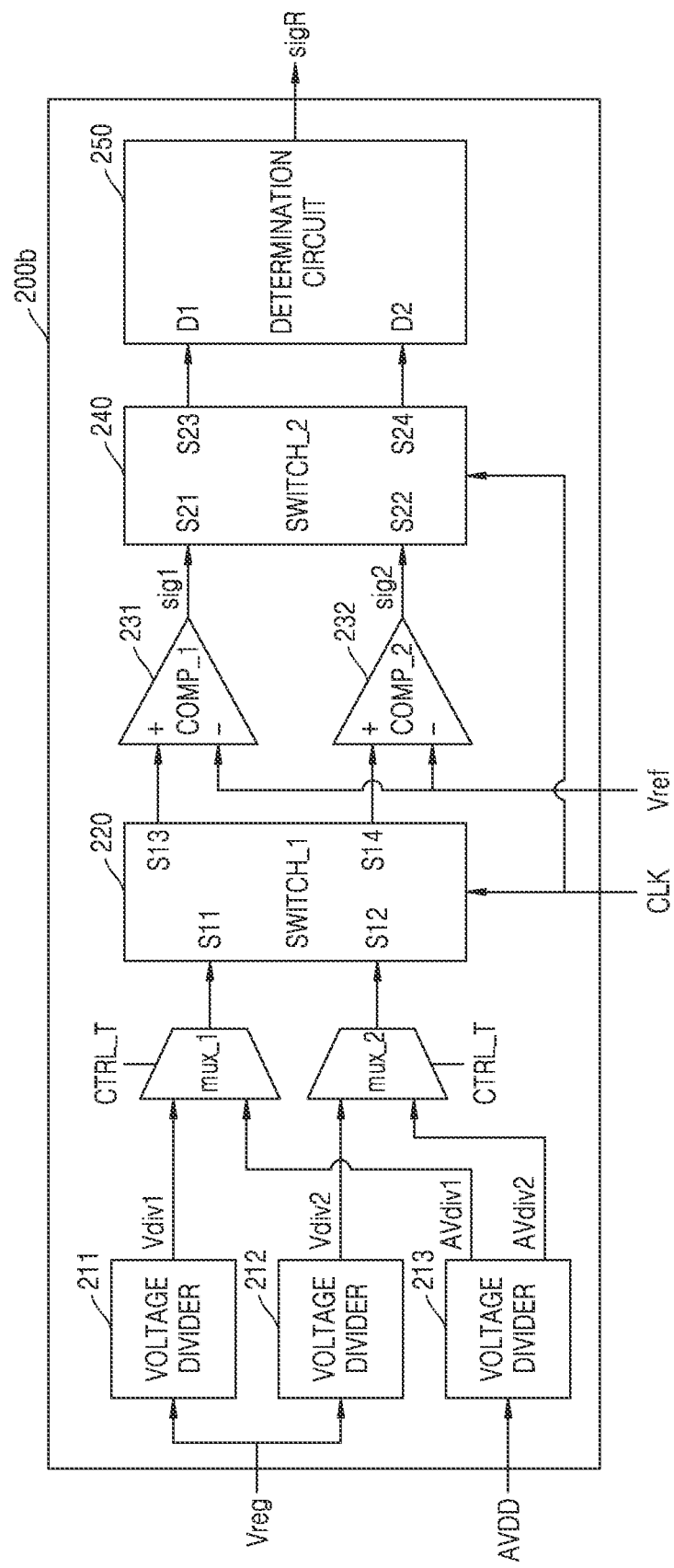
FIG. 12 is a block diagram of a voltage level detector according to an example embodiment.
Figure 13:
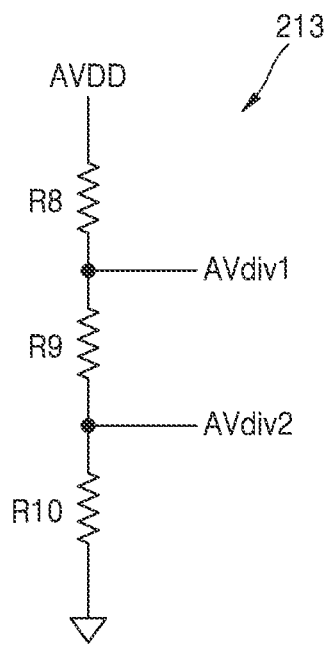
FIG. 13 is a circuit diagram of a voltage divider according to an example embodiment.

FIG. 12 is a block diagram of a voltage level detector 200b according to an example embodiment, and FIG. 13 is a circuit diagram of a voltage divider 213 according to an example embodiment.

Referring to FIG. 12, the voltage level detector 200b may be substantially the same as the voltage level detector 200 described above with reference to FIGS. 1 through 9 and the voltage level detector 200a described with reference to FIGS. 10 and 11, and thus, the same aspects are not repeatedly described.

The voltage level detector 200b may further receive an analog power voltage AVDD from outside. Also, the voltage level detector 200b may further include a power voltage divider 213 configured to divide the analog power voltage AVDD, a first mux mux_1, and a second mux mux_2.

The voltage level detector 200b may perform voltage level detection based on the analog power voltage AVDD, before the voltage regulator 100 operates. By doing so, before the voltage regulator 100 starts to operate, an operating state of the voltage level detector 200b may be identified beforehand. This may be referred to as a prior operation that is performed earlier than a main operation.

The power voltage divider 213 may receive the analog power voltage AVDD and generate a plurality of power division voltages, that is, a first power division voltage AVdiv1 and a second power division voltage AVdiv2, which are proportional to a magnitude of the analog power voltage AVDD. The power voltage divider 213 may include eighth through tenth resistors R8 to R10 as shown in FIG. 13. The eighth through tenth resistors may be serially connected between a node connected to the analog power voltage AVDD and a ground node.

The first power division voltage AVdiv1 may be provided to the first mux mux_1, and the second power division voltage AVdiv2 may be provided to the second mux mux_2. The first mux mux_1 may select and output the first division voltage Vdiv1 of the first voltage divider 211 and the first power division voltage AVdiv1 of the power voltage divider 213, based on a control signal CTRL_T. The second mux mux_2 may select and output the second division voltage Vdiv2 of the second voltage divider 212 and the second power division voltage AVdiv2 of the power voltage divider 213, based on a control signal CTRL_T.

The control signal CTRL_T may control the first mux mux_1 and the second mux mux_2 such that the voltage level detector 200b may perform the prior operation or the main operation. When the voltage level detector 200b performs the prior operation, the first mux mux_1 and the second mux mux_2 may output the first power division voltage AVdiv1 and the second power division voltage AVdiv2, respectively. When the voltage level detector performs the main operation, the first mux mux_1 and the second mux mux_2 may output the first division voltage Vdiv1 and the second division voltage Vdiv2, respectively. The control signal may also be referred to as a test signal.

According to an embodiment, because the voltage level detector 200b performs the prior operation, an abnormal state of a voltage divider may be detected. For example, when a result signal sigR is normally output in the prior operation, and the result signal sigR is not normally output in the main operation, the voltage regulator 100 and/or the first and second voltage dividers 211 and 212 may abnormally operate. When the voltage regulator 100 is in a normal state, it may be identified that the first and second voltage dividers 211 and 212 may abnormally operate.

Figure 14:
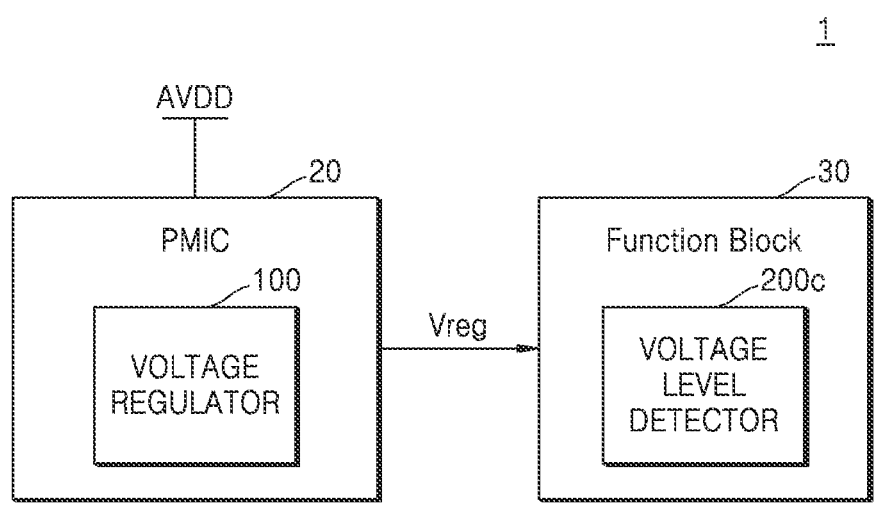
FIG. 14 is a block diagram of a system according to an example embodiment.

FIG. 14 is a block diagram of a system 1 according to an example embodiment. The system 1 may be a semiconductor integrated circuit like a system-on-chip (SoC), according to some embodiments. According to other embodiments, the system 1 may include a printed circuit board and packages mounted thereon. Referring to FIG. 14, the system 1 may include a PMIC 20 and a function block 30.

The PMIC 20 may include the voltage regulator 100 and generate an output voltage Vreg based on an analog power voltage AVDD and supply the output voltage Vreg to the function block 30. A magnitude of the output voltage Vreg may be determined according to the performance and power consumption required by the function block 30.

The function block 30 may operate based on the power provided according to the output voltage Vreg output from the PMIC 20. According to an embodiment, the function block 30 may be a digital circuit configured to process a digital signal, such as an application processor (AP), etc., or an analog circuit configured to process an analog signal, such as an amplifier, etc. Also, the function block 30 may also be a circuit configured to process a mixed signal, such as an analog-to-digital converter (ADC), etc. The system 1 may include multiple function blocks 30.

The function block 30 may include a voltage level detector 200c. The voltage level detector 200c may be substantially the same as the voltage level detector 200 described above with reference to FIGS. 1 through 9, the voltage level detector 200a described with reference to FIGS. 10 and 11, and the voltage level detector 200b described with reference to FIGS. 12 and 13. According to an embodiment, the voltage level detector 200c may provide a result signal sigR to other components (not shown) of the function block 30 and the components may identify whether or not the voltage level detector 200c and/or the PMIC 20 are/is abnormal based on the result signal sigR.

FIG. 14 illustrates that the voltage level detector 200c is included in the function block 30. However, the voltage level detector 200c is not limited thereto and may also be included in the PMIC.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the disclosure has been particularly shown and described with reference to embodiments thereof, it will be understood that various changes in form and details may be made therein without departing from the spirit and scope of the following claims.

What is claimed is:

1. A voltage level detector comprising:
a voltage divider configured to generate a first division voltage and a second division voltage based on a first voltage, which is an output voltage of a voltage regulator;
a first comparator configured to compare either of the first division voltage or the second division voltage with a reference voltage;
a second comparator configured to compare the other of the first division voltage or the second division voltage with the reference voltage;
a first switch configured to convert a connection path between the first and second division voltages and the first and second comparators, according to control of a clock signal;
a determination circuit configured to determine, based on a first comparison signal, which is an output of the first comparator, and a second comparison signal, which is an output of the second comparator, whether or not the voltage level detector is in a normal state and to generate a result signal; and
a second switch configured to convert a connection path between the first and second comparison signals and input terminals of the determination circuit, according to control of the clock signal.

2. The voltage level detector of claim 1, wherein the reference voltage is determined based on a lower limit voltage and an upper limit voltage in a normal range of the first voltage in order to detect the normal range of the first voltage.

3. The voltage level detector of claim 2, wherein:
when the first division voltage reaches the reference voltage, the first voltage reaches the lower limit voltage, and
when the second division voltage reaches the reference voltage, the first voltage reaches the upper limit voltage.

4. The voltage level detector of claim 1, wherein:
the voltage divider comprises a first resistor, a second resistor, and a third resistor that are serially connected between a node connected to the first voltage, and a ground node, and the voltage divider is further configured to output the first division voltage in a node between the first and second resistors and the second division voltage in a node between the second and third resistors.

5. The voltage level detector of claim 1, wherein the voltage divider comprises:
a first voltage divider including a first resistor and a second resistor serially connected between a node connected to the first voltage and a ground node and configured to output the first division voltage in a node between the first and second resistors; and
a second voltage divider including a third resistor and a fourth resistor serially connected between a node connected to the first voltage and a ground node and configured to output the second division voltage in a node between the third and fourth resistors.

6. The voltage level detector of claim 1, wherein: the input terminals of the determination circuit comprise a first input terminal and a second input terminal, and
the determination circuit is further configured to determine that the voltage level detector is in the normal state, based on a logic high level of a signal input to the first input terminal and a logic low level of a signal input to the second input terminal.

7. The voltage level detector of claim 6, wherein the determination circuit is further configured to invert the signal input to the second input terminal and perform an AND operation on the inverted signal and the signal input to the first input terminal.

8. The voltage level detector of claim 6, wherein the determination circuit is further configured to determine that the first and second comparators are in normal states, based on the logic high level of the signal input to the first input terminal and the logic low level of the signal input to the second input terminal.

9. The voltage level detector of claim 1, further comprising:
a power voltage divider configured to generate a first power division voltage and a second power division voltage, based on a second voltage received from outside;
a first mux configured to select and output, to the first switch, any one of the first division voltage and the first power division voltage based on a test signal; and
a second mux configured to select and output, to the first switch, any one of the second division voltage and the second power division voltage based on the test signal, wherein
the first switch is further configured to convert a connection path between output terminals of the first mux and the second mux and the first and second comparators, according to control of the clock signal.

10. The voltage level detector of claim 9, wherein:
the test signal is configured such that, before an operation of the voltage regulator is started, the first power division voltage is output by the first mux, and
the second power division voltage is output by the second mux.

11. A voltage level detector comprising:
a voltage divider configured to receive a first voltage, which is an output voltage of a voltage regulator, and generate a first division voltage and a second division voltage based on the first voltage;
a first switch comprising a first input terminal and a second input terminal configured to receive the first and second division voltages, respectively, and a first output terminal and a second output terminal configured to output, according to control of a clock signal, the first and second division voltages, respectively;

a first comparator connected to one of the first and second output terminals of the first switch and configured to receive a reference voltage and output a first comparison signal;

a second comparator connected to the other of the first and second output terminals of the first switch and configured to receive the reference voltage and output a second comparison signal;

a second switch comprising a third input terminal and a fourth input terminal configured to receive the first and second comparison signals, respectively, and a third output terminal and a fourth output terminal configured to output, according to control of the clock signal, the first and second comparison signals, respectively; and a determination circuit configured to receive the first and second comparison signals and output a result signal indicating whether or not the voltage level detector is in a normal state.

12. The voltage level detector of claim 11, wherein:

when the clock signal has a first logic level, the first switch is further configured to connect the first input terminal with the second output terminal and the second input terminal with the first output terminal, and the second switch is further configured to connect the third input terminal with the fourth output terminal and the fourth input terminal with the third output terminal.

13. The voltage level detector of claim 12, wherein when the clock signal has a second logic level that is different from the first logic level:

the first switch is further configured to connect the first input terminal with the first output terminal and the second input terminal with the second output terminal, and the second switch is further configured to connect the third input terminal with the third output terminal and the fourth input terminal with the fourth output terminal.

14. The voltage level detector of claim 11, wherein:

the determination circuit comprises a fifth input terminal and a sixth input terminal, and when the determination circuit receives a signal of a logic high level through the fifth input terminal and a signal of a logic low level through the sixth input terminal, the result signal indicates the normal state of the voltage level detector.

15. The voltage level detector of claim 11, wherein when the first voltage is in a normal range and the result signal is changed according to toggling of the clock signal, the result signal indicates an abnormal state of the voltage level detector.

16. The voltage level detector of claim 15, wherein the result signal indicates an abnormal state of at least one of the first and second comparators.

17. The voltage level detector of claim 11, wherein: the first and second division voltages are proportional to the first voltage, and a magnitude of the first division voltage is greater than a magnitude of the second division voltage.

18. The voltage level detector of claim 11, wherein:

the voltage divider comprises:

a first voltage divider configured to generate the first and second division voltages; and a second voltage divider configured to generate, based on a second voltage output from outside, a first power division voltage and a second power division voltage that are proportional to the second voltage, and the voltage level detector further comprises:

a first mux configured to receive the first division voltage and the first power division voltage and output, according to control of a test signal, any one of the first division voltage and the first power division voltage to the first switch; and a second mux configured to receive the second division voltage and the second power division voltage and output, according to control of the test signal, the other of the first division voltage and the first power division voltage to the first switch.

19. A voltage level detector comprising:

a voltage division circuit configured to generate a first division voltage and a second division voltage that are proportional to a first voltage received from outside;

a comparison circuit configured to compare each of the first division voltage and the second division voltage with a reference voltage and output a first comparison signal and a second comparison signal;

a determination circuit configured to generate a result signal based on the first and second comparison signals; and a switch circuit configured to convert a connection path between output terminals of the voltage division circuit and input terminals of the comparison circuit and convert a connection path between output terminals of the comparison circuit and input terminals of the determination circuit, according to control of a clock signal.

20. The voltage level detector of claim 19, wherein the result signal is toggled according to the conversion of the connection paths of the switch circuit so as to indicate an abnormal state of the comparison circuit.

* * * * *